(12) United States Patent
Wang (10) Patent No.: US 11,486,290 B2
(45) Date of Patent: *Nov. 1, 2022

(54) EXHAUST GAS AFTER-TREATMENT MIXING DEVICE

(71) Applicant: Tenneco (Suzhou) Emission System Co., LTD., Suzhou (CN)

(72) Inventor: Cong Wang, Suzhou (CN)

(73) Assignee: TENNECO (SUZHOU) EMISSION SYSTEM CO., LTD., Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,692

(22) Filed: Nov. 15, 2021

(65) Prior Publication Data

US 2022/0074336 A1 Mar. 10, 2022

Related U.S. Application Data

(63) Continuation of application No. 16/647,481, filed as application No. PCT/CN2017/092996 on Jun. 27, 2018, now Pat. No. 11,208,933.

(30) Foreign Application Priority Data

Sep. 19, 2017 (CN) .......................... 201710851869.0

(51) Int. Cl.
*F01N 3/28* (2006.01)

(52) U.S. Cl.
CPC .................. *F01N 3/2892* (2013.01)

(58) Field of Classification Search
CPC .. F01N 3/2892; F01N 3/2066; F01N 2240/20; F01N 2470/06; F01N 2570/14; F01N 2610/02; F01N 2250/02; F01N 2470/08

USPC ......................................................... 60/317
See application file for complete search history.

(56) References Cited

U.S. PATENT DOCUMENTS

| | | | |
|---|---|---|---|
| 4,909,635 | A | 3/1990 | Lecoffre et al. |
| 8,033,104 | B2 | 10/2011 | Zhang |
| 8,397,495 | B2 | 3/2013 | Salanta et al. |
| 9,352,276 | B2 | 5/2016 | Sampath |

(Continued)

FOREIGN PATENT DOCUMENTS

| | | |
|---|---|---|
| CN | 201551965 U | 8/2010 |
| CN | 204877615 U | 12/2015 |

(Continued)

*Primary Examiner* — Devon C Kramer
*Assistant Examiner* — Kelsey L Stanek
(74) *Attorney, Agent, or Firm* — Harness, Dickey & Pierce, P.L.C.

(57) ABSTRACT

An exhaust gas after-treatment mixing device comprises a casing, a mixing pipe located in the casing and a partition plate separating the casing into an upstream space and a downstream space. The mixing pipe comprises a first pipe portion located in the upstream space and a second pipe portion located in the downstream space. The first pipe portion is provided with at least two first openings located on two sides of the first pipe portion, respectively. A shielding plate shields an upstream portion of at least one of the first openings. The shielding plate is shaped and positioned within the casing to urge exhaust gas flowing through the upstream space away from the first end of the mixing pipe and around the shielding plate prior to entering the first openings.

18 Claims, 9 Drawing Sheets

(56) References Cited

U.S. PATENT DOCUMENTS

| | | | |
|---|---|---|---|
| 9,784,163 | B2 | 10/2017 | Noren, IV et al. |
| 11,208,933 | B2 * | 12/2021 | Wang .................... F01N 3/2892 |
| 2010/0005790 | A1 * | 1/2010 | Zhang ....................... F01N 3/36 |
| | | | 60/324 |
| 2016/0215673 | A1 * | 7/2016 | Noren, IV .......... B01F 25/4521 |
| 2018/0066559 | A1 | 3/2018 | Haverkamp et al. |
| 2018/0306083 | A1 | 10/2018 | Sampath et al. |
| 2019/0211732 | A1 | 7/2019 | Haverkamp et al. |
| 2020/0131969 | A1 * | 4/2020 | Tucker ................ B01F 25/3131 |

FOREIGN PATENT DOCUMENTS

| | | |
|---|---|---|
| CN | 106014560 A | 10/2016 |
| CN | 205714373 U | 11/2016 |
| CN | 106246303 A | 12/2016 |
| CN | 106523091 A | 3/2017 |
| CN | 206129367 U | 4/2017 |
| CN | 106640301 A | 5/2017 |
| CN | 107165704 A | 9/2017 |
| CN | 206487537 U | 9/2017 |
| CN | 107559078 A | 1/2018 |
| CN | 107575287 A | 1/2018 |
| CN | 207178013 U | 4/2018 |
| CN | 207526559 U | 6/2018 |
| DE | 9113807 U1 | 12/1991 |
| DE | 102012216676 A1 | 3/2014 |
| EP | 2168672 A1 | 3/2010 |
| JP | 2006-77576 A | 3/2006 |
| JP | 5090890 B2 | 12/2012 |
| WO | WO-2012044233 A1 | 4/2012 |
| WO | WO-2016111701 A1 | 7/2016 |

* cited by examiner

EXHAUST GAS AFTER-TREATMENT MIXING DEVICE

CROSS-REFERENCE TO RELATED APPLICATION

This patent application is a continuation of U.S. patent application Ser. No. 16/647,481 filed on Mar. 13, 2020, which is a 35 U.S.C. § 371 National Phase application of International (PCT) Patent Application No. PCT/CN2018/092996 filed on Jun. 27, 2018, and claims priority to Chinese Patent Application No. 201710851869.0, filed on Sep. 19, 2017 with an invention title of "Exhaust Gas After-Treatment Mixing Device", the entire content of which is incorporated herein by reference. The PCT International Patent Application was filed and published in Chinese.

TECHNICAL FIELD

This application relates to an exhaust gas after-treatment mixing device which belongs to a technical field of engine exhaust gas after-treatment.

BACKGROUND

Studies have shown that the uniformity of ammonia distribution in the exhaust gas after-treatment system (such as Selective Catalytic Reduction system, SCR system) has a significant impact on the overall performance and durability of the system. If the ammonia distribution is not uniform, it will cause too much ammonia in the local area and easily cause ammonia leakage, while in other ammonia-thin areas, the conversion efficiency of nitrogen oxides (NOx) will be too low. The uneven distribution of ammonia over a long period of time will lead to uneven aging of the catalyst, which will affect the overall performance of the catalyst. In addition, the uneven distribution of urea droplets will cause the temperature of the local pipe wall or the mixed structure to be too low, forming crystals, and in severe cases, the exhaust pipe will be blocked, resulting in a decrease in engine power performance.

SUMMARY

An object of the present application is to provide an exhaust gas after-treatment mixing device with better mixing effect.

In order to achieve the above object, the present application adopts the following technical solution: an exhaust gas after-treatment mixing device includes a casing, a mixing pipe located in the casing and a partition plate fixed on a periphery of the mixing pipe. The casing is separated by the partition plate to form a first space communicating with a first after-treatment carrier assembly and a second space communicating with a second after-treatment carrier assembly. The partition plate includes a first plate on one side of the mixing pipe, a second plate on the other side of the mixing pipe and a third plate connecting the first plate and the second plate. The third plate is provided with a through hole through which the mixing pipe extends. The mixing pipe comprises a first pipe portion located in the first space and a second pipe portion located in the second space, wherein the first pipe portion is provided with at least two first openings located on two sides thereof, respectively. The exhaust gas after-treatment mixing device further includes a first shielding plate and a second shielding plate shielding front ends of the first openings, respectively, so that most of exhaust gas needs to flow bypass the first shielding plate and the second shielding plate before entering the first openings.

As a further improved technical solution of the present application, the second pipe portion is provided with at least two second openings located on two sides thereof, respectively, and the second openings communicate with the second space.

As a further improved technical solution of the present application, the casing is provided with a first axis, the mixing pipe is provided with a second axis, and the first axis is perpendicular to the second axis.

As a further improved technical solution of the present application, the mixing pipe is arranged vertically, the first plate and the second plate both extend vertically but along opposite directions, and the third plate extends horizontally.

As a further improved technical solution of the present application, the partition plate is substantially Z-shaped, the first plate is located at a lower left of the mixing pipe, and the second plate is located at an upper right of the mixing pipe.

As a further improved technical solution of the present application, the first plate is provided with a first arc-shaped surface abutting on the second pipe portion, and the second plate is provided with a second arc-shaped surface abutting on the first pipe portion.

As a further improved technical solution of the present application, the exhaust gas after-treatment mixing device further includes a rectifying plate fixed to the mixing pipe, and the first shielding plate and the second shielding plate are located on two sides of the rectifying plate, respectively.

As a further improved technical solution of the present application, the rectifying plate comprises a third curved surface abutting on the first pipe portion, and the first shielding plate and the second shielding plate extend sidewardly from the third curved surface along opposite directions.

As a further improved technical solution of the present application, the first shielding plate is provided with a first arc edge abutting on an inside of the casing, and the second shielding plate is provided with a second arc edge abutting on an inside of the casing.

As a further improved technical solution of the present application, the exhaust gas after-treatment mixing device further includes a plate located at a bottom of the mixing pipe, and the plate is provided with an arc-shaped protrusion protruding into the second pipe portion.

Compared with the prior art, the present application improves the uniformity of airflow distribution and the mixing effect by providing the first shielding plate and the second shielding plate for the airflow adjustment.

DETAILED DESCRIPTION

Figure 1:
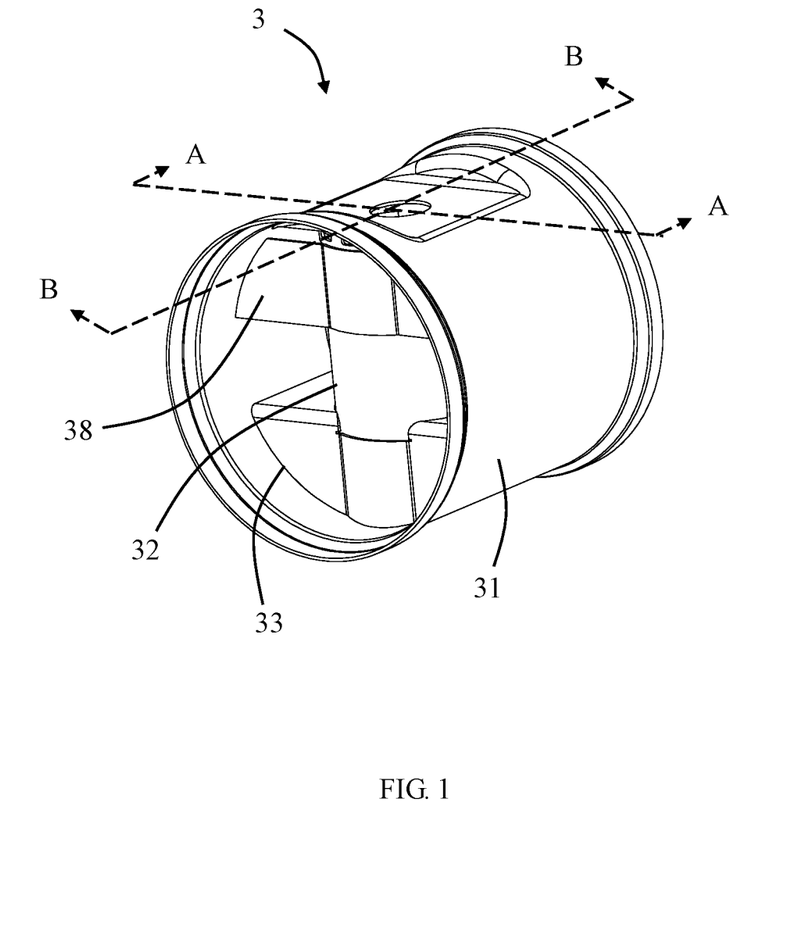
FIG. 1 is a schematic perspective view of an exhaust gas after-treatment mixing device according to the present application.
Figure 2:
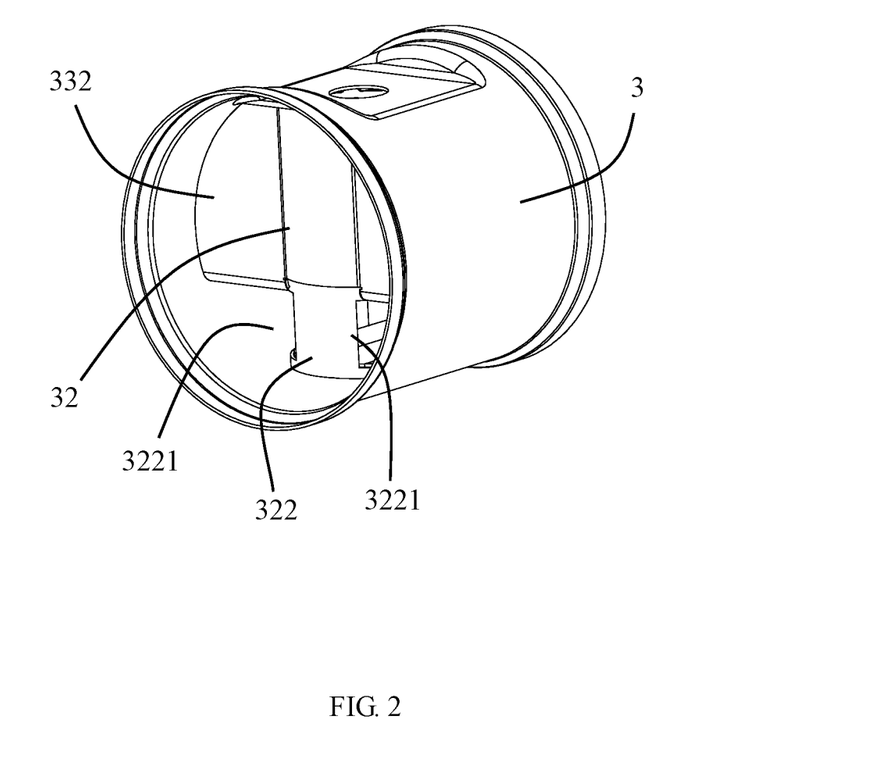
FIG. 2 is another schematic perspective view of FIG. 1.
Figure 3:
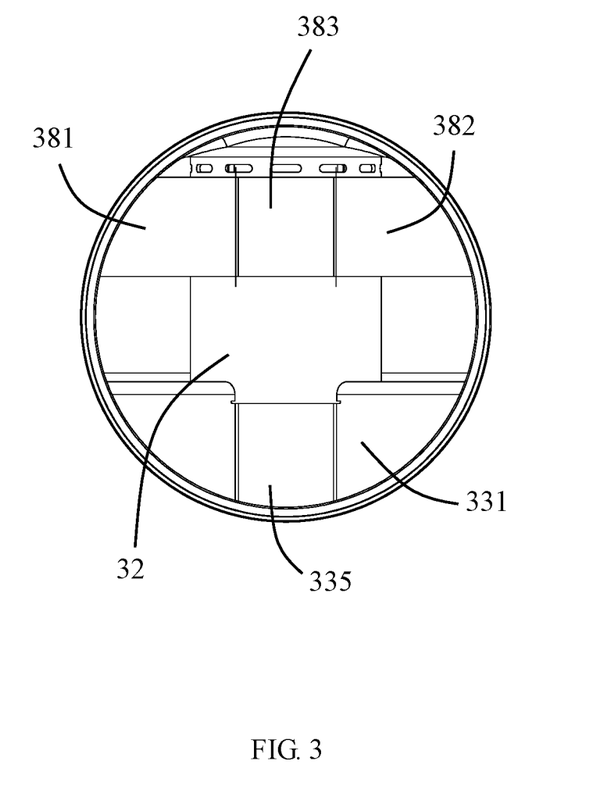
FIG. 3 is a left side view of FIG. 1.
Figure 4:
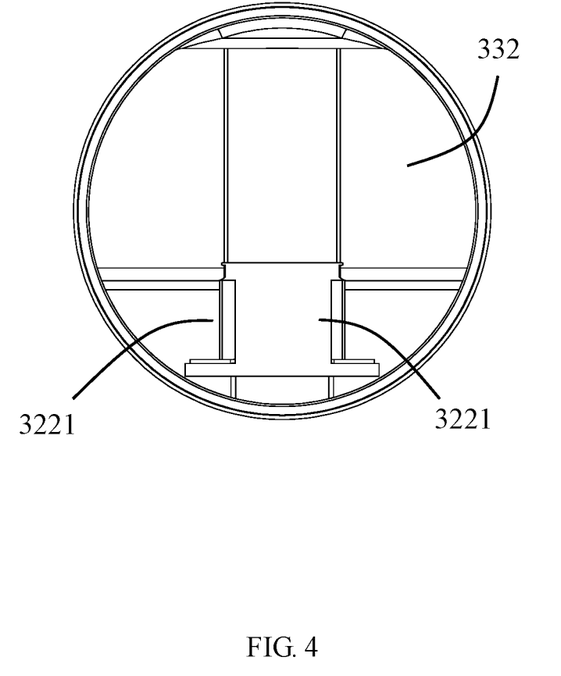
FIG. 4 is a right side view of FIG. 1.
Figure 5:
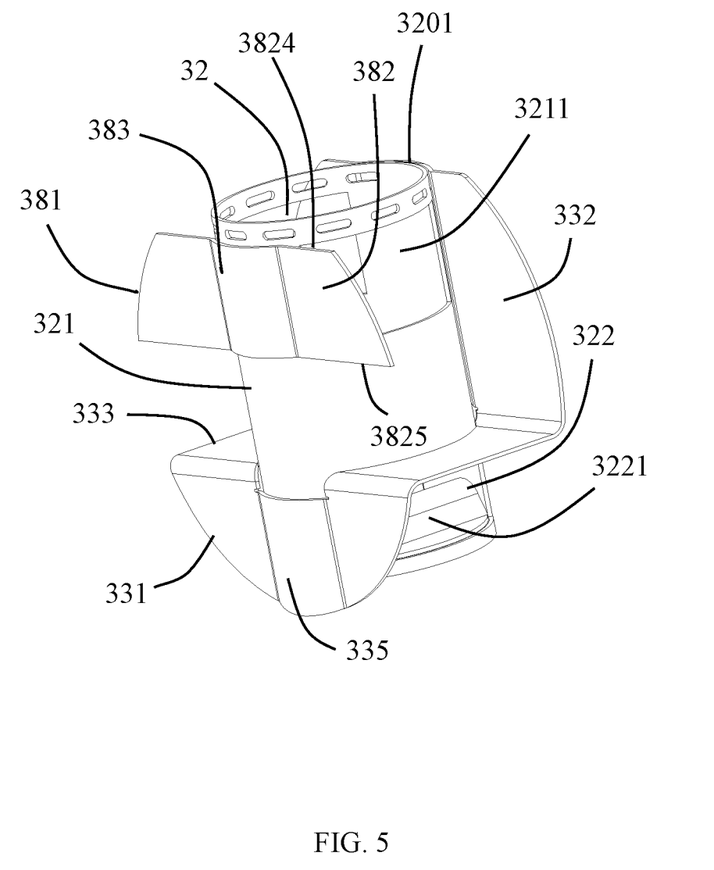
FIG. 5 is a perspective view with the casing in FIG. 1 removed.
Figure 6:
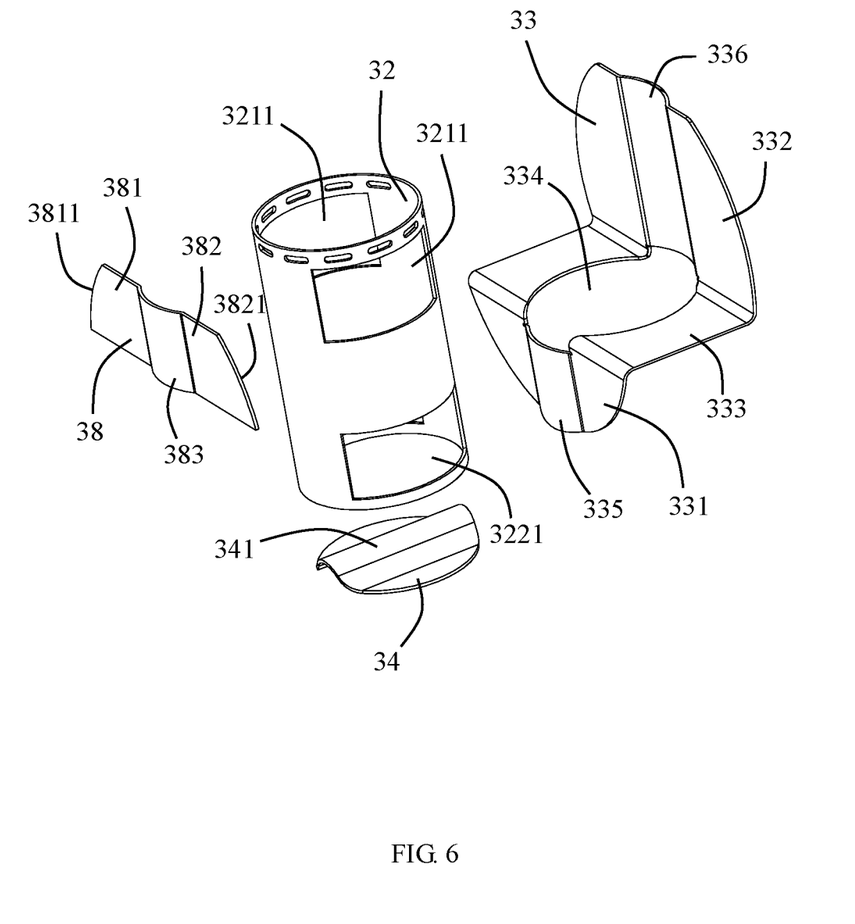
FIG. 6 is an exploded perspective view of FIG. 5.
Figure 7:
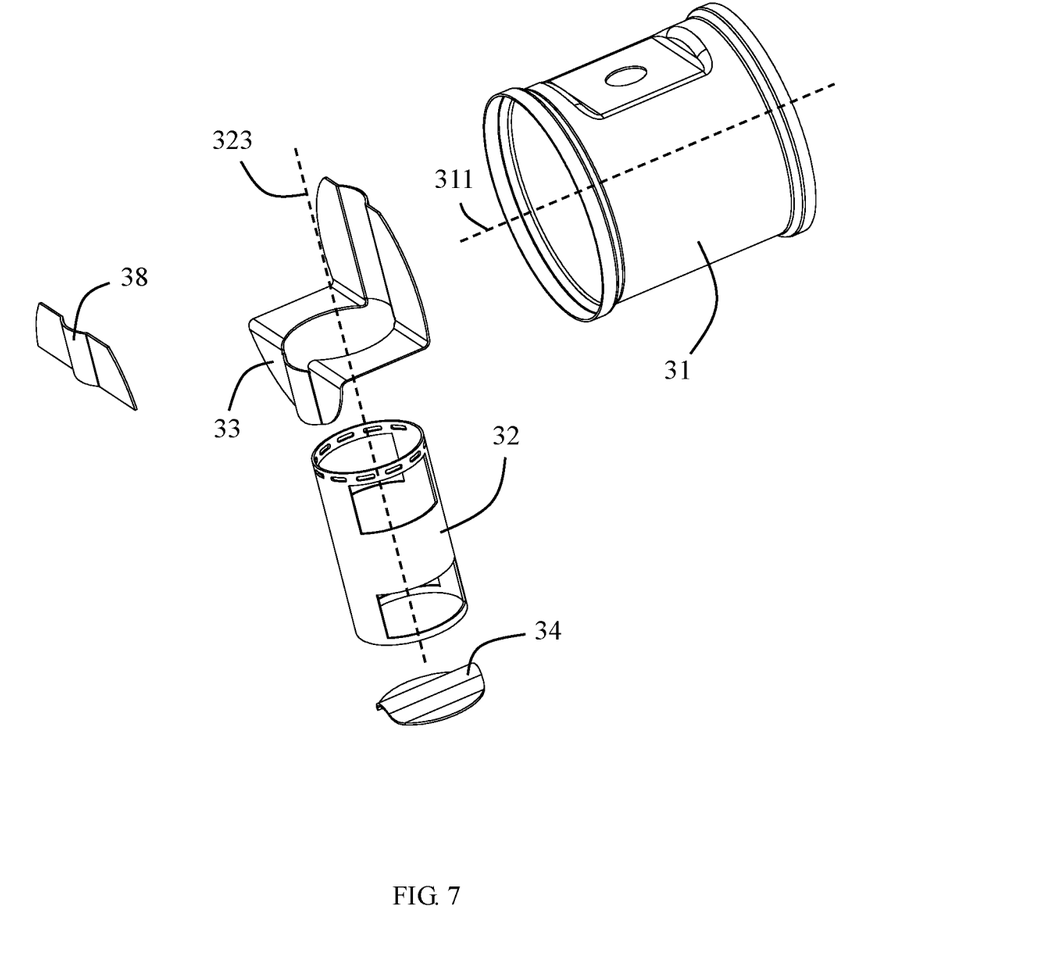
FIG. 7 is an exploded perspective view of FIG. 6.
Figure 8:
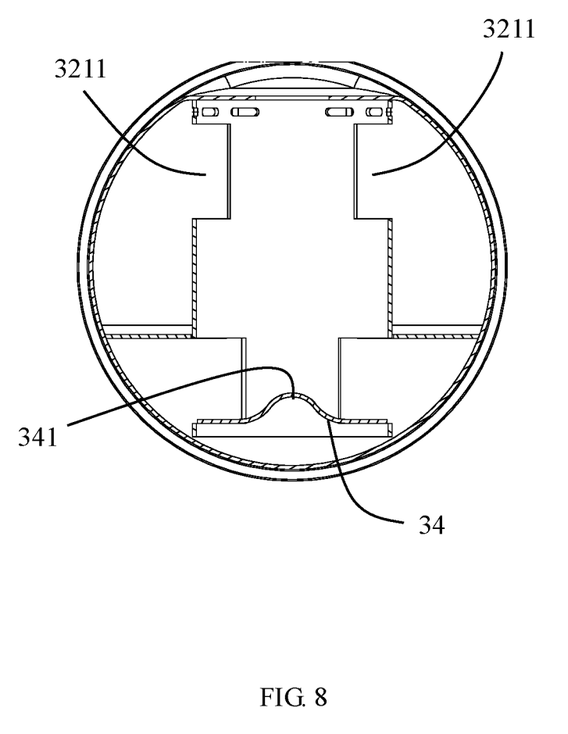
FIG. 8 is a schematic cross-sectional view taken along a line A-A in FIG. 1.
Figure 9:
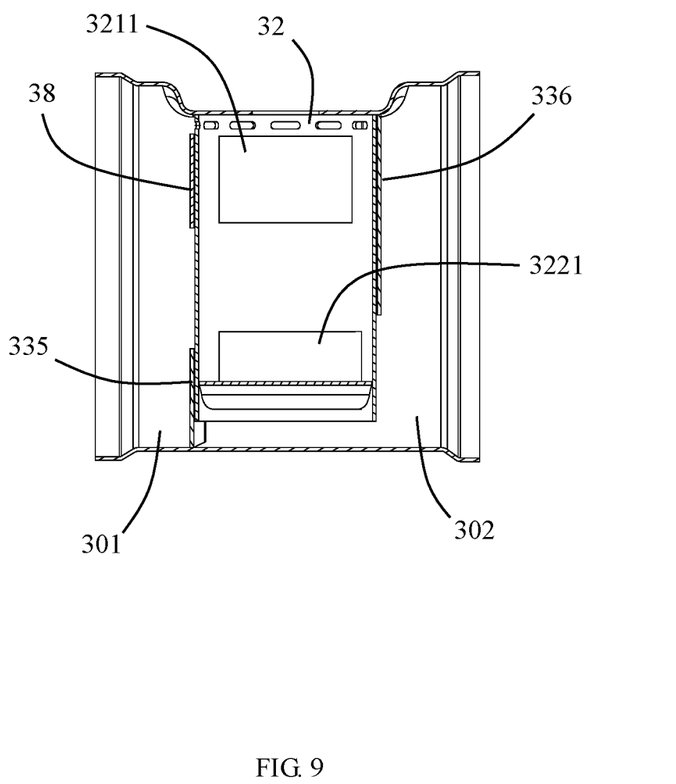
FIG. 9 is a schematic cross-sectional view taken along a line B-B in FIG. 1.

Please refer to FIG. 1 to FIG. 9, the present application discloses an exhaust gas after-treatment mixing device 3 for purifying exhaust gas of an engine. The exhaust gas after-treatment mixing device 3 includes a casing 31, a mixing pipe 32 located in the casing 31, a partition plate 33 fixed on a periphery of the mixing pipe 32, a plate 34 located at a bottom of the mixing pipe 32, and a rectifying plate 38 for partially shielding the mixing pipe 32.

The casing 31 is separated by the partition plate 33 to form a first space 301 for communicating with a first after-treatment carrier assembly and a second space 302 for communicating with a second after-treatment carrier assembly. In one embodiment of the present application, the first after-treatment carrier assembly may include a Diesel Oxidation Catalyst (DOC) and a Diesel Particulate Filter (DPF) located downstream of the DOC. The second after-treatment carrier assembly includes a Selective Catalytic Reduction (SCR).

The mixing pipe 32 includes a first pipe portion 321 located in the first space 301 and a second pipe portion 322 located in the second space 302. The first pipe portion 321 is provided with at least two first openings 3211 on two sides of the first pipe portion 321, respectively. The second pipe portion 322 is provided with at least two second openings 3221 on two sides of the second pipe portion 322, respectively. The second openings 3221 communicate with the second space 302. The first openings 3211 are used for airflow to flow in, and the second openings 3221 are used for airflow to flow out, so that a double swirl mixing effect is formed.

The rectifying plate 38 includes a first shielding plate 381 and a second shielding plate 382 shielding front ends of the first openings 3211, respectively. As a result, most of the exhaust gas needs to flow bypass the first shielding plate 381 and the second shielding plate 382 before entering the first openings 3211. This arrangement prevents the exhaust gas from directly rushing into the mixing pipe 32 and reflecting on the pipe wall, which affects the uniformity and stability of the airflow mixing. In the illustrated embodiment of the present application, the rectifying plate 38 includes a third curved surface 383 abutting on the first pipe portion 321. The first shielding plate 381 and the second shielding plate 382 are respectively extended oppositely from two sides of the third curved surface 383. Preferably, the third curved surface 383 is welded to the first pipe portion 321. The first shielding plate 381 is provided with a first arc edge 3811 abutting on an inside of the casing 31, and the second shielding plate 382 is provided with a second arc edge 3821 abutting on an inside of the casing 31, thereby forming an obstruction to the airflow in order to achieve the rectification effect. The second shielding plate 382 is curved and includes a leading edge 3824 positioned upstream of a trailing edge 3825. Leading edge 3824 is positioned closer to an end 3201 of mixing pipe 32 than trailing edge 3825.

In the illustrated embodiment of the present application, the casing 31 is of a cylindrical shape and is provided with a first axis 311. The mixing pipe 32 is of a cylindrical shape and is provided with a second axis 323. The first axis 311 intersects the second axis 323. Preferably, the first axis 311 is perpendicular to the second axis 323. Of course, in other embodiments, the casing 31 and the mixing pipe 32 may have other shapes, such as an oval shape.

The partition plate 33 includes a first plate 331 on one side of the mixing pipe 32, a second plate 332 on the other side of the mixing pipe 32, and a third plate 333 connecting the first plate 331 and the second plate 332. The third plate 333 is provided with a through hole 334 through which the mixing pipe 32 extends. In the illustrated embodiment of the present application, the mixing pipe 32 is arranged vertically. The first plate 331 and the second plate 332 both extend vertically but along opposite directions. The third plate 333 extends horizontally. Please refer to FIG. 5 to FIG. 7, the partition plate 33 is substantially Z-shaped. The first plate 331 is located at a lower left of the mixing pipe 32, and the second plate 332 is located at an upper right of the mixing pipe 32. The first plate 331 is provided with a first curved surface 335 abutting on the second pipe portion 322, and the second plate 332 is provided with a second curved surface 336 abutting on the first pipe portion 321.

The plate 34 is located at the bottom of the second pipe portion 322. The plate 34 is provided with an arc-shaped protrusion 341 protruding toward the second pipe portion 322 in order to guide the airflow to flow backwardly. The plate 34 can prevent the urea solution from being sprayed directly onto the exhaust pipe, thereby reducing the risk of urea deposit.

The exhaust gas after-treatment mixing device 3 is provided with an injector mounting seat (not shown) located on the casing 31 and used to install a urea injector for spraying atomized urea solution into the mixing pipe 32.

In the illustrated embodiment of the present application, when the exhaust gas of the engine passes through the first after-treatment carrier assembly into the first space 301, the exhaust gas bypasses the first shielding plate 381 and the second shielding plate 382 and then enters the mixing pipe 32 through the first openings 3211. When the injection conditions are satisfied, the urea injector sprays urea droplets into the mixing pipe 32, and the atomized urea droplets is mixed with the exhaust gas of the engine and move downstream, and then enter the second space 302 through the second openings 3221 to reach the second after-treatment carrier assembly. Under the action of the plate 34, the airflow is better reversed (for example, flow upstream) to form a double swirl flow. In this way, the distance and time of urea evaporation are increased by the swirl flow, the uniformity of airflow mixing is improved and the risk of urea deposit is reduced.

The above embodiments are only used to illustrate the present application and not to limit the technical solutions described in the present application. The understanding of this specification should be based on those skilled in the art, although the present application has been carried out with reference to the above-mentioned embodiments in the detailed description, however, those of ordinary skill in the art should understand that those skilled in the art can still modify or equivalently replace the present application, and all technical solutions and improvements without departing from the spirit and scope of the present application should be within the scope of the claims of the present application.

What is claimed is:

1. An exhaust gas after-treatment mixing device comprising:
   a casing;
   a mixing pipe located in the casing, the mixing pipe including an axis and a first end adapted to receive an injected reductant;
   a partition separating the casing into an upstream space and a downstream space, wherein the mixing pipe comprises a first pipe portion located in the upstream space and a second pipe portion located in the downstream space, wherein the first pipe portion is provided with at least two first openings located on two sides of the first pipe portion, respectively; and a shielding plate shielding an upstream portion of at least one of the at least two first openings, the shielding plate being shaped and positioned within the casing to urge exhaust gas flowing through the upstream space away from the first end of the mixing pipe and around the shielding plate prior to entering the at least two first openings.

2. The exhaust gas after-treatment mixing device of claim 1, wherein the partition comprises a first plate on one side of the mixing pipe and a second plate on the other side of the mixing pipe.

3. The exhaust gas after-treatment mixing device of claim 2, wherein the partition further comprises a third plate connecting the first plate and the second plate, the third plate including a through hole through which the mixing pipe extends.

4. The exhaust gas after-treatment mixing device of claim 3, wherein the first plate, the second plate, and the third plate define a Z-shaped cross-section.

5. The exhaust gas after-treatment mixing device of claim 2, wherein the first plate includes an arcuately shaped edge positioned adjacent to an inner surface of the casing.

6. The exhaust gas after-treatment mixing device of claim 5, wherein the second plate includes an arcuately shaped edge positioned adjacent to the inner surface of the casing.

7. The exhaust gas after-treatment mixing device of claim 1, wherein the shielding plate includes an arcuately shaped edge abutting an inner surface of the casing.

8. The exhaust gas after-treatment mixing device of claim 1, wherein the shielding plate is curved and includes a leading-edge positioned upstream of a trailing edge of the shielding plate, the leading edge being positioned closer to the first end of the mixing pipe than the trailing edge.

9. The exhaust gas after-treatment mixing device according to claim 1, wherein the second pipe portion is provided with at least two second openings located on two sides of the second pipe portion, respectively, and the at least two second openings communicate with the second space.

10. The exhaust gas after-treatment mixing device of claim 1, wherein the shielding plate is positioned upstream of the mixing pipe axis and exhaust gas flows around the shielding plate in order to enter the at least two first openings.

11. The exhaust gas after-treatment mixing device of claim 1, further comprising another shielding plate shielding an upstream portion of the other of the at least two first openings.

12. The exhaust gas after-treatment mixing device of claim 11, wherein the shielding plate and the another shielding plate are fixed to the mixing pipe.

13. An exhaust gas after-treatment mixing device comprising:

a casing;

a mixing pipe located in the casing, the mixing pipe including an axis and a first end adapted to receive an injected reductant;

a partition separating the casing into an upstream space and a downstream space, the partition comprising a first plate on an upstream side of the mixing pipe axis and a second plate on a downstream side of the mixing pipe axis, wherein the mixing pipe comprises a first pipe portion located in the upstream space and a second pipe portion located in the downstream space, wherein the first pipe portion is provided with at least two first openings located on two sides of the first pipe portion, respectively; and a shielding plate positioned upstream of the at least two first openings, the shielding plate being shaped and positioned within the casing to urge exhaust gas flowing through the upstream space away from the first end of the mixing pipe and around the shielding plate prior to entering the at least two first openings.

14. The exhaust gas after-treatment mixing device of claim 13, wherein the partition further comprises a third plate connecting the first plate and the second plate, the third plate including a through hole through which the mixing pipe extends.

15. The exhaust gas after-treatment mixing device of claim 13, wherein the shielding plate is curved and includes a leading-edge positioned upstream of a trailing edge of the shielding plate, the leading edge being positioned closer to the first end of the mixing pipe than the trailing edge.

16. The exhaust gas after-treatment mixing device of claim 13, wherein the second pipe portion is provided with at least two second openings located on two sides of the second pipe portion, respectively, and the at least two second openings communicate with the second space.

17. The exhaust gas after-treatment mixing device of claim 13, wherein the shielding plate includes a central portion fixed to the mixing pipe and opposite ends spaced apart from the mixing pipe.

18. The exhaust gas after-treatment mixing device of claim 17, wherein each end of the shielding plate ends obstructs the exhaust gas from directly flowing into the at least two first openings.

\* \* \* \* \*